United States Patent [19]

Ingram et al.

[11] Patent Number: 4,536,823
[45] Date of Patent: Aug. 20, 1985

[54] ELECTRIC PANEL BOARD HAVING AN IMPROVED EXTRUDED BASE PAN CONFIGURATION

[75] Inventors: Wayne A. Ingram, Stone Mountain; Stephen L. Johnson, Cumming; Thomas E. Coleman, Decatur, all of Ga.

[73] Assignee: Siemens-Allis, Inc., Atlanta, Ga.

[21] Appl. No.: 315,565

[22] Filed: Oct. 27, 1981

[51] Int. Cl.³ .............................................. H02B 1/04
[52] U.S. Cl. .................................... 361/355; 361/361; 361/376
[58] Field of Search ............... 361/346, 353, 355, 358, 361/361, 363, 376; 339/198 N

[56] References Cited

U.S. PATENT DOCUMENTS

| | | | |
|---|---|---|---|
| 3,349,292 | 10/1967 | Meacham | 361/361 |
| 3,375,411 | 3/1968 | Mrowka | 361/355 |
| 3,588,620 | 6/1971 | Wasileski | 361/363 |
| 4,002,388 | 1/1977 | Menocal | 339/22 B |
| 4,118,754 | 10/1978 | Duggan | 361/355 |
| 4,137,424 | 1/1979 | Hesse et al. | 174/97 |
| 4,167,768 | 9/1979 | Baker et al. | 361/355 |
| 4,167,769 | 9/1979 | Luke et al. | 361/355 |
| 4,231,633 | 11/1980 | Luke et al. | 339/242 |
| 4,251,851 | 2/1981 | Diersing et al. | 361/353 |

FOREIGN PATENT DOCUMENTS 1010545  5/1977  Canada.

Primary Examiner—A. D. Pellinen
Assistant Examiner—Gregory D. Thompson
Attorney, Agent, or Firm—F. W. Powers; J. L. James

[57] ABSTRACT

An improved panel board construction is described, including an extruded insulative base pan which slidably engages at least one main-line bus bar and a neutral connector element and which has a plurality of electrical contact points. The base pan also prevents current flow through the base pan between any two of the contact points of the main-line bus bars. A protrusion extending from the base pan having a tortuously formed surface thereon prevents current flow through the base pan. The panel board is provided with interchangeable main-line lugs which may be used to directly contact the main-line bus bars or, alternatively, support a main-line circuit breaker between the lugs and the main-line bus bars. The base pan is symmetrically formed by an extrusion process so that it may be adaptable for use with a variety of panel board sizes simply by shearing the base pan to form the appropriate length.

12 Claims, 17 Drawing Figures

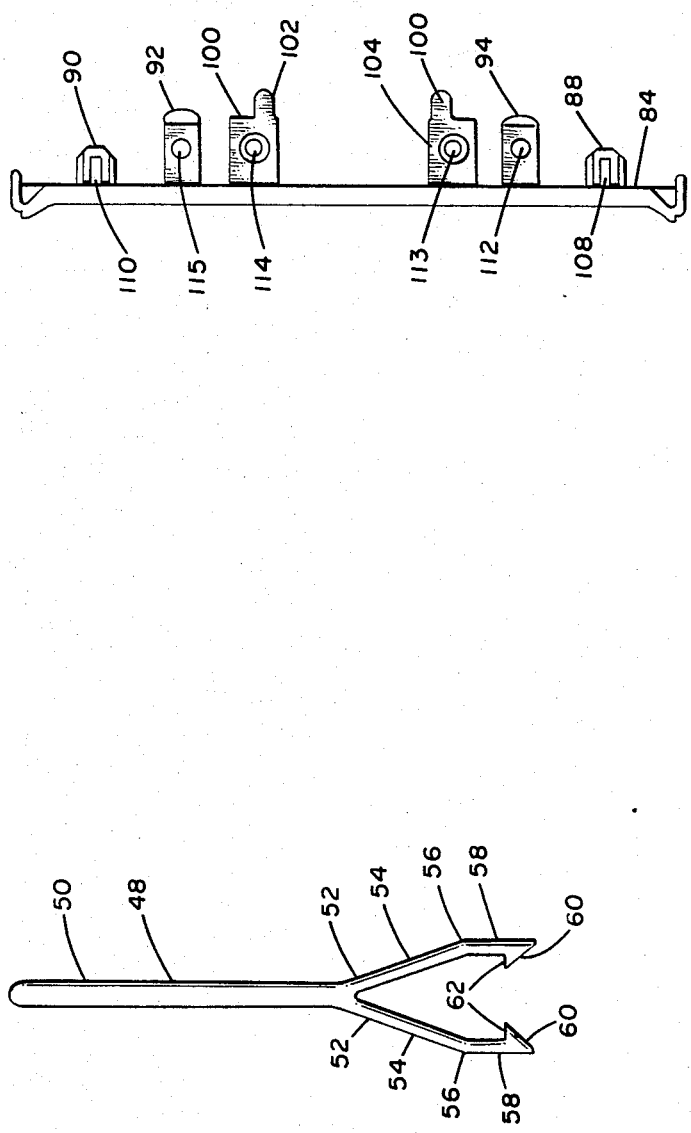

ELECTRIC PANEL BOARD HAVING AN IMPROVED EXTRUDED BASE PAN CONFIGURATION

BACKGROUND OF THE INVENTION

A. Field of the Invention

The present invention relates generally to devices for the distribution of electrical power and, more particularly, to panel boards for home and light-industrial applications.

B. Description of the Prior Art

In the field of panel board construction for home or light-inductrial electrical distribution centers, electrical connectors have commonly been supported on a molded insulative base pan. For each size of panel board constructed by a manufacturer, a separate inventory of molded base pans had to be manufactured and maintained. Thus, a need has developed for base pans which are adaptable to variously sized, panel-board configurations and which are relatively inexpensive to manufacture. This need has been partially met by extruded base pans of the type described in U.S. Ser. No. 104,101 filed Dec. 17, 1979 for "Electric Distribution Panel Having Extruded Base". In that application, an extruded base pan is described, wherein many major elements are formed integrally with the base by extruding a plastic insulating material. The present invention represents an improvement over the extruded base pan construction described therein.

SUMMARY OF THE INVENTION

An object of the invention is to provide an extruded base pan in which the main electrical lugs, main-line bus bars, and neutral elements all are slidably engageable with an insulative base pan and do not require molded support blocks for each element.

A further object of the invention is to provide a means for preventing current flow between contact points of main-line bus bars, wherein the current-flow prevention means is integral with the insulative base pan.

A further object of the invention is to provide an economical means for slidably engaging a line shield to the base pan.

A further object of the invention is to provide a means for positioning main-line electrical lugs so that the same lug may be used alternatively for direct electrical connection to a main-line bus bar or indirect connection to the bus bar via a main-line circuit breaker.

Yet another object of the invention is to provide a means for simply mounting the base pan onto a circuit breaker box.

A further object of the invention is to provide a novel panel board construction in which the main-line bus bars, neutral connector elements, electrical lugs, line shield and guide wires may be easily installed.

Other objects, advantages and novel features of the present invention will become apparent from the following detailed description of the invention when considered in conjunction with the accompanying drawings.

BRIEF DESCRIPTION OF THE DRAWINGS

FIG. 4 is an end view of the line shield in the preferred embodiment;

FIG. 5 is a top view of the end piece attachments for an extruded base pan in the preferred embodiment;

DETAILED DESCRIPTION OF THE PREFERRED EMBODIMENT

Figure 1:
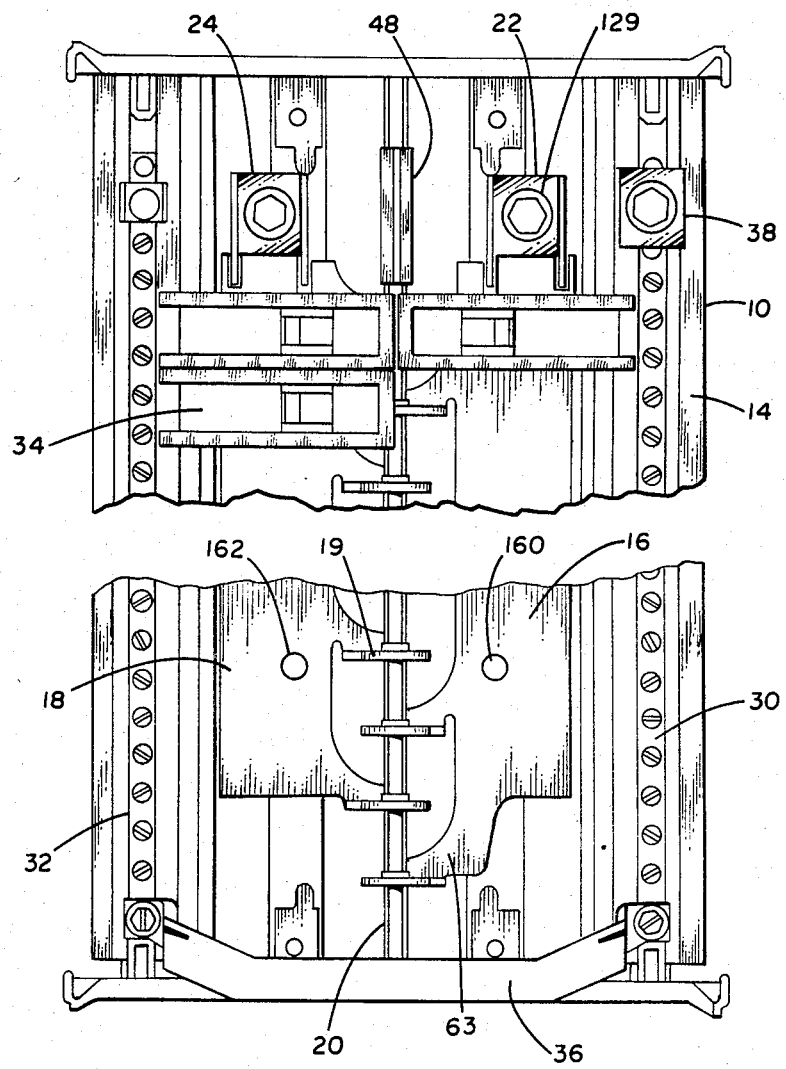
FIG. 1 is a front view of one embodiment of the subject development in which main-line lugs are in direct electrical contact with a pair of parallel bus bars.

Referring now to FIG. 1, a panel board designated generally as 10 is shown. The base pan may be made out of an insulative material such as Noryl, a trademark of General Electric Company. Other kinds of rigid insulative material may be used, and in the preferred embodiment, it is desirable for the rigid insulative material to be one that is easily extrudable and relatively inexpensive.

Figure 2:
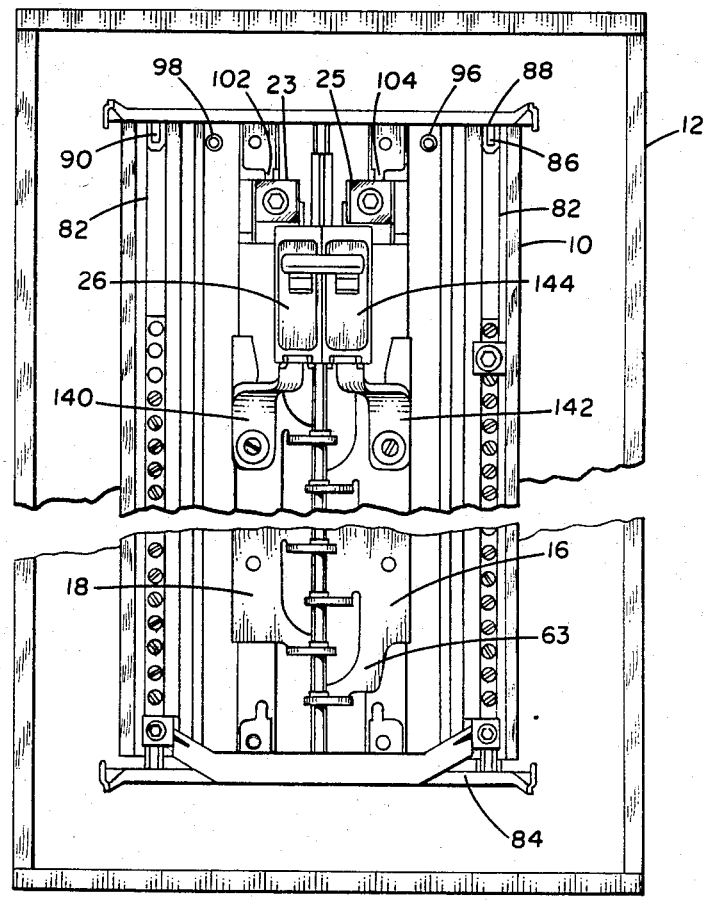
FIG. 2 is a front view of one embodiment of the subject development in which the subject panel board is mounted in a box and the main-line lugs are electrically connected to the bus bars through two-pole, common-trip circuit breakers.

As illustrated in FIG. 2, the panel board 10 may be mounted in a box 12 when used for home applications or lightindustrial applications. The means for, and method of, mounting the base pan into the box will be described in further detail hereinbelow.

Referring again to FIG. 1, the panel board 10 is an assembly, including an insulative base pan 14, wherein the base pan has a first integral means for engaging a pair of bus bars 16 and 18. In the preferred embodiment, bus bars 16, 18 are slidably received by the first integral means of the base pan so that the bus bars extend parallel to one another. In this configuration, outwardly extending stabs 19 are in a linear interfaced relationship with one another. The bus bars in most applications in the United States will have a voltage differential of 230 volts between each bus bar. The base pan 14 further includes a second integral means, for preventing current flow across the base pan between bus bars 16 and 18. The second integral means in the preferred embodiment includes a protrusion 20 extending from the base pan having a tortuously formed surface discussed in more detail hereinbelow.

As can be seen in FIG. 1, a pair of main-line lugs 22 and 24 are engaged with the base pan 14. In one embodiment, the mainline lugs 22 and 24 are in direct electrical contact with bus bars 16 and 18. Thus, when electrical leads (not shown) are attached to lugs 22 and 24, a voltage may be applied directly to bus bars 16 and 18.

Figure 13:
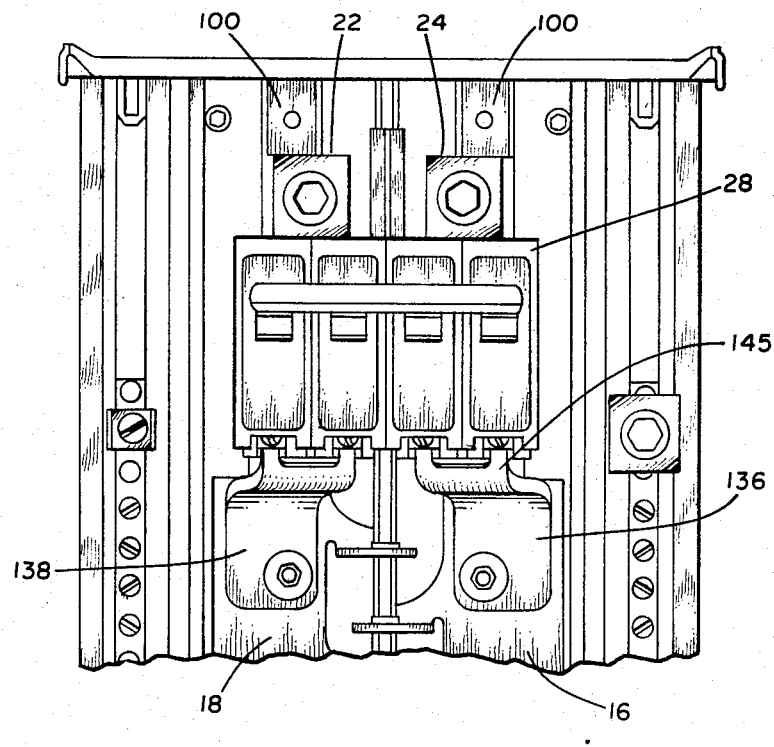
FIG. 13 is a front view of the subject base pan with main-line lugs electrically attached to a pair of bus bars through a pair of load straps in a four-pole, common-trip circuit breaker.

As can be seen in FIG. 13, in another embodiment, lugs 22 and 24 may be reversed. In this embodiment, a four-pole, common-trip circuit breaker 28 may be inserted between lugs 22 and 24 and bus bars 16 and 18. In yet another embodiment illustrated in FIG. 2, the slightly different-sized lugs 23 and 25 may be used to connect a two-pole, common-trip circuit breaker 26 to bus bars 16 and 18. These alternative embodiments will be discussed in more detail hereinbelow.

Panel board 10 further includes a pair of neutral connector elements 30 and 32 engaged with the base pan 14. A single-pole circuit breaker 34 may be mounted on the base pan 14 and bus bar 16 or 18 through stab 19. Each single-pole circuit breaker 34 is electrically connected to neutral connector element 30 or 32. As illustrated in FIG. 1, neutral connector elements 30 and 32 are electrically joined by neutral bar 36 so that a single neutral lead (not shown) attached to neutral lug 38 may provide a neutral connection for all single-pole circuit breakers used in the panel board 10.

Figure 3:
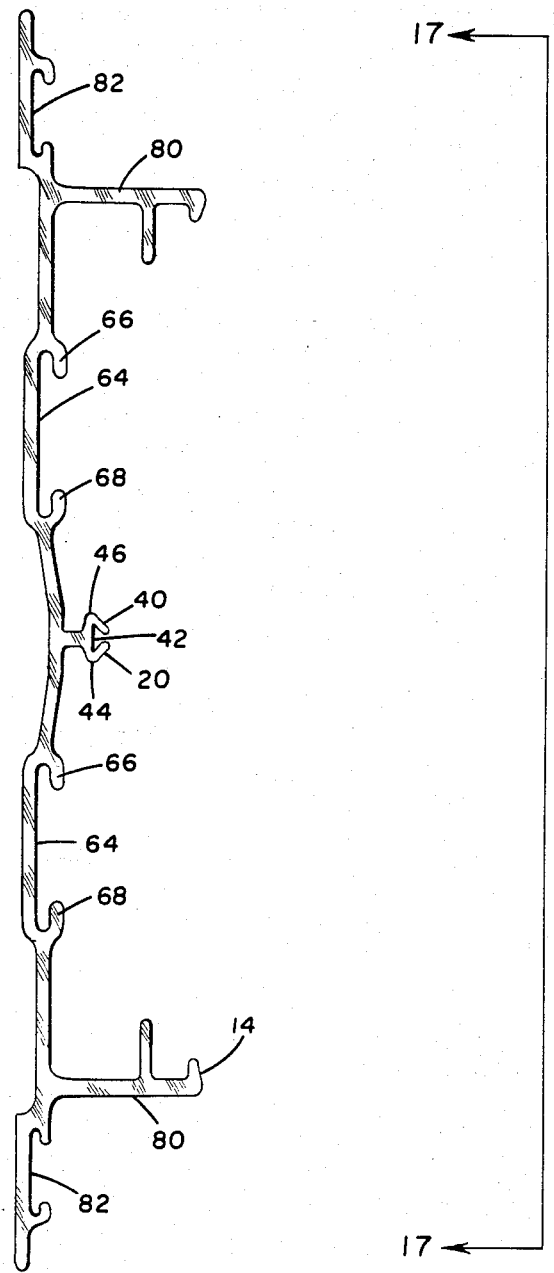
FIG. 3 is an end view of the preferred embodiment of the extruded base pan.

Referring now to FIG. 3, in the preferred embodiment, the base pan 14 may be symmetrically formed by an extrusion process. A centrally disposed rail 40 may be provided for use as the integral means for preventing current flow across the base pan between the bus bars, including a protrusion extending from the base pan having a tortuously formed surface. In the preferred embodiment, the tortuously formed surface of the protrusion 20 or rail 40 may be in the form of an inverted-T opening 42 extending through the length of the rail 40. The configuration of the preferred embodiment is particularly desirable because the inverted-T opening 42 creates a greatly increased electrical path across the insulative base pan between any two bus bars, yet the inverted-T opening is a relatively simple configuration to extrude. The inverted-T opening 42 is also particularly desirable because it creates a pair of outer lips 44 and 46 on which a line shield 48, FIG. 1, may be slidably mounted thereon.

Thus, in the preferred embodiment, the first integral means is a protusion 20 extending from the base pan and has a rail 40 and the second integral means thereon. The second integral means has a tortuously formed surface in the shape of an inverted "T" opening extending throughout the rail 40 and lips 44 and 46 on the underside of the rail. The lips are for slidably engaging bus bars 16 and 18 and line shield 48. The tortuously formed surface and the lips prevent current flow across the base pan between the bus bars.

Referring now to FIG. 4, which is an end view of line shield 48 of FIG. 1, the line shield includes a first singular portion 50 and a second bifurcated portion 52. Each section of the second bifurcated portion 52 includes a first leg portion 54, a knee portion 56 and a second leg portion 58. At the base of each leg portion 58 extends an angular inwardly extending foot 60. As will be readily apparent, the second bifurcated portion 52 surrounds a length of the centrally disposed rail 40 of the preferred embodiment when slidably engaged with the base pan 14 of FIG. 1 or FIG. 2. An upper-foot section 62 of each angular inwardly extending foot 60 prevents the line shield 48 from being disengaged from the base pan 14 other than by sliding the line shield along the length of the inner rail. As illustrated in FIG. 1 and FIG. 2, the line shield creates a physical barrier between lugs 22, 24 or 23, 25 to prevent accidental contact between both lugs during servicing.

In addition to the two functions of protrusion 20 discussed above, the protrusion also serves to slidably engage arm portions 63 of bus bars 16 and 18 and align the bus bars in a parallel configuration as illustrated in FIGS. 1 and 2.

Referring once again to FIG. 3, the base pan 14 of the preferred embodiment is further provided with a means integral to the base pan for engaging at least one mainline lug. This engagement means may include a first pair of channels 64 for slidably engaging a pair of main-line lugs. Each channel may be disposed in a parallel relationship on either side of the centrally disposed rail 40 so that appropriately designed main-line lugs may be slidably engaged on either side of the centrally disposed rail. Each channel may include a first and second hook portion 66 and 68, respectively. As will be discussed in more detail hereinbelow, each main-line lug is provided with two oppositely disposed ledges 70 and 72 (FIG. 9) for slidable engagement with first and second hook formations 66 and 68 (FIG. 3).

In the preferred embodiment, the base pan is further provided with a pair of double hook formations 80 for supporting the end of a circuit breaker 34 adjacent to neutral connector elements 30, 32.

The preferred embodiment of the base pan 14, as illustrated in FIG. 3, further includes a second pair of channels 82 for slidably engaging a pair of neutral connector elements. The neutral connector elements are described in detail in U.S. Ser. No. 104,101, filed Dec. 17, 1979.

As illustrated in FIG. 2, the panel board assembly further includes a pair of end pieces 84 and 86 slidably engaged in the second pair of channels 82 by respective engagement protrusions 88 and 90. A detailed view of end piece 84 is shown in FIG. 5. Each end piece 84, 86 further includes a second pair of engagement protrusions 92 and 94 not visible in FIGS. 2 or 3, but which slidably engage base pan 14 under the base pan 14 at connection points 96 and 98, FIG. 2.

Referring once again to FIG. 5, end piece 84 is further provided with a keying arrangement 100, including two outwardly extending notched protrusions 102 and 104. The purpose of this keying arrangement will be discussed in further detail hereinbelow. As can further be seen in FIG. 5, engagement protrusions 88 and 90 are provided with rectangular clips 108 and 110 while the second pair of engagement protrusions 92 and 94 and the outwardly extending notched protrusions 102 and 104 are provided with circular orifices 112–115. The combination of rectangular clips and circular orifices are particularly advantageous in that the rectangular clips provide leeway in attaching each end piece 84, 86 to the base pan 14 without requiring additional attachment hardware, while the circular orifices enhance alignment of each end piece to the base pan.

Figure 6:
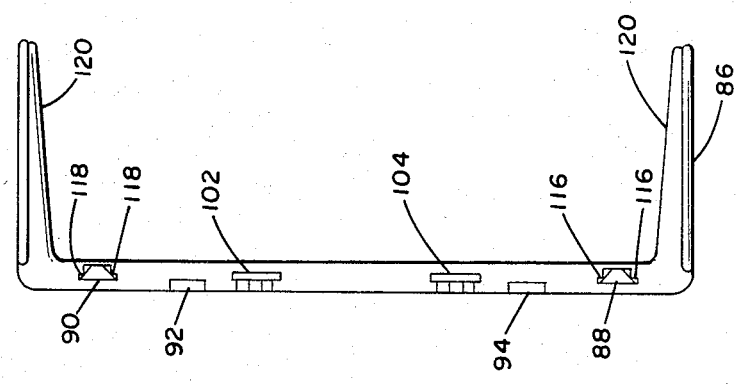
FIG. 6 is a top view of an end piece in the preferred embodiment.

Referring now to FIG. 6, which is an end view of the end piece 86, the relative position of engagement protrusions 88, 90, the second pair of engagement protrusions 92, 94, and the outwardly extending notched protrusions 102, 104 are more readily discernible. As can be seen in FIG. 6, engagement protrusions 88 and 90 include a pair of outwardly extending rectangular ledges 116 and 118, respectively. Each end piece 86 is further provided with a pair of guide-wire posts 120 which extend normally outward from the base pan when the end pieces are assembled to the base pan. Each guidewire post serves to reduce tangling of wires within the circuit breaker box.

Figure 7:
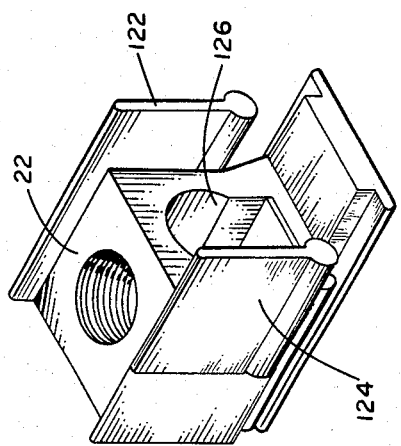
FIG. 7 is an isometric view of a main-line lug of the preferred embodiment.

Referring now to FIG. 7, which is an isometric view of a main-line lug 22 or 24, it should be noted that the main-line lug 22 and main-line lug 24 are exact mirror images of one another; and, therefore, it is necessary to describe only one of the lugs in great detail. Main-line lug 22 includes a pair of ribs 122 and 124. An opening 126 provides a means for passing a main-line wire (not shown) therethrough and for electrically connecting the mainline lug to either a bus bar or a circuit breaker.

Figure 8:
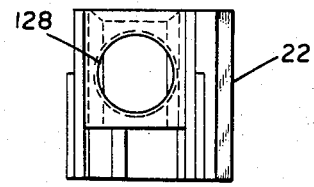
FIG. 8 is a front view of the main-line lug of FIG. 7.

Referring now to FIG. 8, lug 22 is provided with a threaded passageway 128 for engagement with an electrical connection screw 129 illustrated in FIG. 1. The electrical connection screw provides a means for enhancing electrical contact between the main-line wire and either a circuit breaker or a bus bar.

Figure 9:
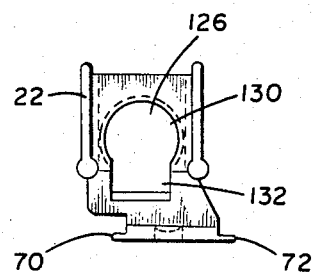
FIG. 9 is an end view of the main-line lug of FIG. 7.

Referring now to FIG. 9, opening 126 of lug 22 further includes a second perpendicularly extending passageway 130 for receiving the main-line wire and either a bus bar or circuit breaker electrical connection. As can be seen in the figure, the second passageway 130 includes a rectangular extension 132 through which the bus bar or electrical connection of a circuit breaker passes.

Figure 10:
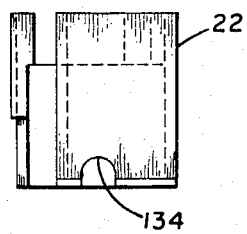
FIG. 10 is a bottom view of the main-line lug of FIG. 7.

As best illustrated in FIG. 10, the lug 22 is further provided with a keyhole 134 for engagement with the keying arrangement 100 when lug 22 is used to engage a circuit breaker as illustrated in FIG. 13. As previously noted, each lug 22 and 24 of FIG. 13 are mirror images of each other so that when they are interchanged, the outwardly extending notched protrusions 102 and 104 of the keying arrangement as illustrated in FIG. 5 will not engage keyhole 134 (FIG. 10) as illustrated in FIG. 1. In this manner, lugs 22 and 24 can be used to directly engage bus bars 16 and 18.

As discussed in the preceding paragraph, it may be desired to place a circuit breaker 28 (FIG. 13) in between bus bars 16, 18, and lugs 22, 24. In that embodiment, all that is required is to interchange lugs 22 and 24 as illustrated in FIG. 13 and to attach load straps 136 and 138 to bus bars 16 and 18. As will be noted in FIG. 13, in this embodiment, the keyhole of lugs 22 and 24 completely encases the key or outwardly extending notched protrusion from keying arrangement 100. In this embodiment, a slightly longer base pan is required to contain the same number of circuit breakers. However, this presents no problem with the improved circuit breaker base pan as described herein because it is necessary with the symmetrically formed base pan of the preferred embodiment to simply shear the end of the base pan extrusion to the length desired. In yet another embodiment, it may be desired, as previously noted, to insert a two-pole circuit breaker between the mainline lugs and the bus bars 16 and 18. This embodiment is illustrated in FIG. 2. In this embodiment, it may be desirable to use a slightly different-sized pair of lugs 23 and 25. The keyhole of this size lug may be designed to accept only a portion of each outwardly extending notched protrusion 102 and 104. This allows the same notched protrusion to locate a main-line lug in a variety of displacement locations. In this embodiment, it should be noted that slightly different-sized load straps 140 and 142 are used to engage the two-pole circuit breaker 144; the difference between the load straps for two-pole and four-pole circuit breakers being that a four-pole circuit breaker load strap has an additional extension 145 as can be seen in FIG. 13.

Figure 11:
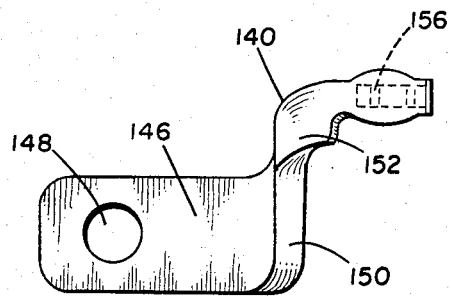
FIG. 11 is a front view of a load strap in the preferred embodiment.
Figure 12:
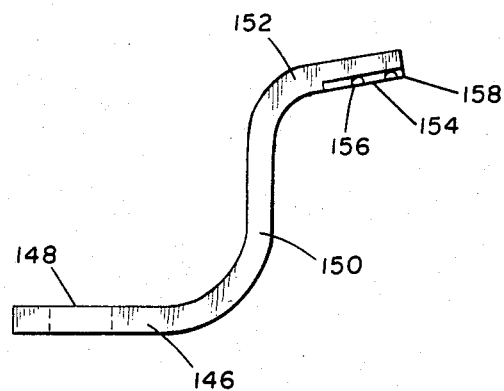
FIG. 12 is a side view of a load strap in the preferred embodiment.
Figure 14:
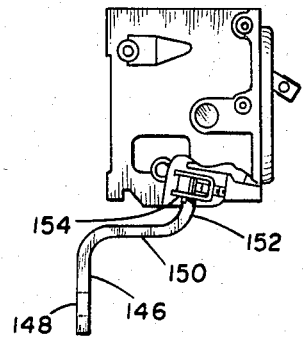
FIG. 14 is a diagrammatic side view of a circuit breaker attached to a load strap in the preferred embodiment.

Referring now to FIG. 11, which is a front view of a load strap 140 for a two-pole circuit breaker, the load strap 140 may be made out of 3/16th aluminum with a tin plate finish. In the preferred embodiment, the load strap may include a first strap portion 146 for locating in juxtaposition to a bus bar. The first strap portion may include an orifice 148 for attachment to the bus bar. Strap 140 further includes a second strap portion 150 (FIG. 12) having a section extending perpendicularly to the first strap portion 146. And finally, the load strap 140 has a third strap portion 152 extending from the second strap portion 150 in a direction generally parallel to the first strap portion 146. The third strap portion includes an indented section 154 on the underside thereof, including a pair of notches 156 and 158 therein, for connection with a circuit breaker as illustrated in FIG. 14.

Figure 15:
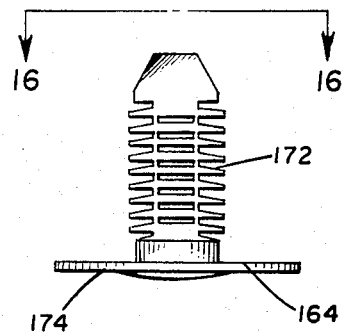
FIG. 15 is a side view of a fastener used to mount the subject base pan onto a circuit breaker box.
Figure 16:
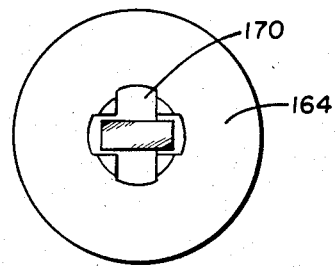
FIG. 16 is a top view of the fastener in FIG. 15.

By mounting a main-line circuit breaker directly onto the main-line lugs and load straps, it is possible to use a minimum amount of hardware in assembling a circuit breaker panel board of the type as described herein. The base pan, as previously discussed, is designed to slidably engage bus bars 16 and 18 FIG. 1. After the bus bars are engaged in the desired location, the base pan-bus bar assembly can be easily mounted inside a circuit breaker box at attachment points 160 and 162 as illustrated in FIG. 1. Snap-in, bus-bar fasteners 164 of the type illustrated in FIGS. 15 and 16 may be used for this purpose. As can be seen in FIG. 16, the bus-bar fastener 164 includes an upper-cross section 170 for simple snap-in installation. The fastener is further provided with circular ribs 172 extending outwardly along the axis of the fastener. And finally, an end cap 174 maintains the fastener on the outer side of the circuit breaker box.

Figure 17:
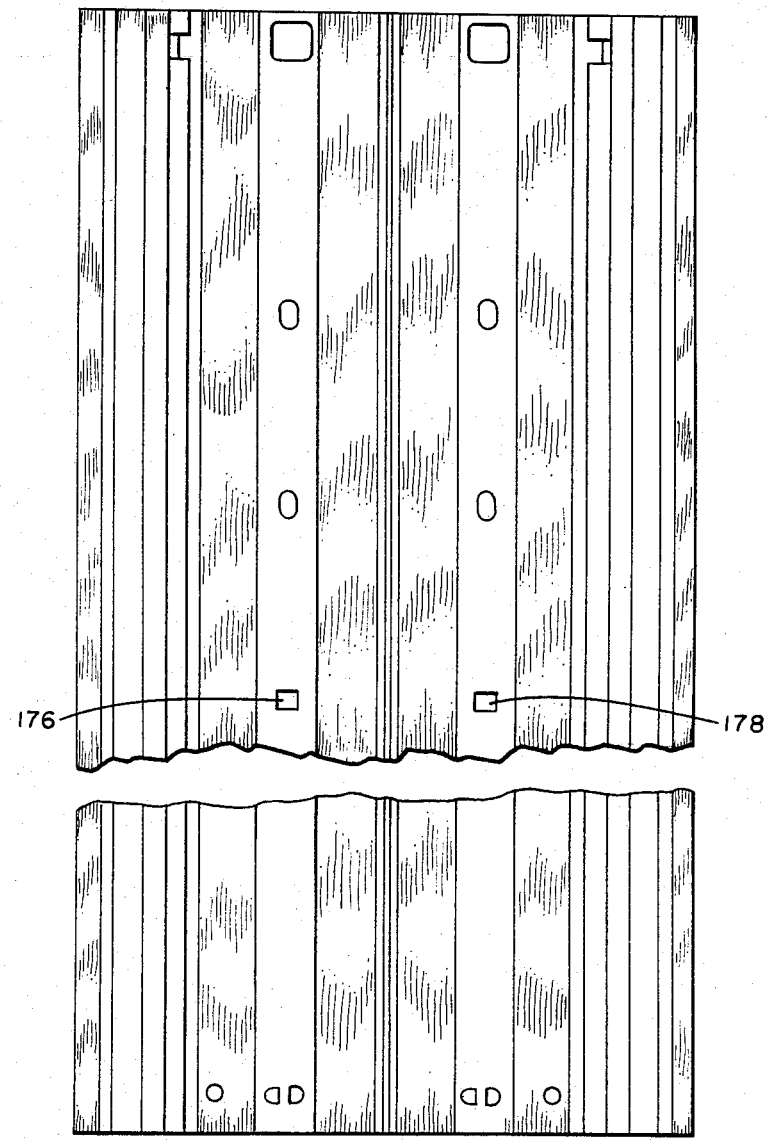
FIG. 17 is a front view of the base pan of FIG. 3.

As can be seen in FIG. 17, after the base pan 14 is extruded, a plurality of variously shaped orifices may be provided in the base pan for fastening purposes. The use of square orifices 176 and 178 is particularly desirable for use in conjunction with fasteners of the type illustrated in FIGS. 15 and 16. The combination of the upper-cross section 170 of each fastener together with the square orifice 176 or 178 provides simple alignment of the base pan and fastener with respect to a circuit breaker box.

Although the invention has been described and illustrated in detail, it is to be clearly understood that the same is by way of illustration and example only, and it is not to be taken by way of limitation; the spirit and scope of this invention being limited only by the terms of the appended claims.

We claim:

1. An insulative base pan for a circuit breaker panelboard comprising:
   a centrally disposed rail extending the length of said pan, said rail having an inverted-T opening throughout the length thereof, said rail including a pair of outer lips extending the length thereof for slidably engaging respective bus bars;
   a first pair of channels extending the length of said base pan, each channel being disposed in a parallel relationship on either side of said rail for slidably receiving a pair of main-line lugs; and
   a second pair of channels extending the length of said base pan, each channel being disposed parallel to said rail and along the outer edge of said base pan for slidably receiving elongated neutral elements thereon.

2. An insulative base pan as recited in claim 1, wherein said base pan is symmetrically formed so that it is reversibly operative to engage said bus bars when said base pan is rotated 180° with respect to said bus bars.

3. A base pan as recited in claim 1, including
a pair of outwardly extending double hook formations, each formation being disposed along said base pan parallel to said rail and said channels for mounting a neutral end of a circuit breaker thereupon.

4. A base pan as recited in claim 1, wherein said outer lips of the rail slidably engage a line shield.

5. A base pan as recited in claim 1, wherein said inverted-T opening increases resistance to current flow across said base pan between contact points of said bus bars by increasing the surface leakage path.

6. A base pan as recited in claim 4, wherein said base pan is symmetrically formed by an extrusion proccess.

7. A base pan as recited in claim 1, further comprising means integral with said base pan for interchangeably engaging a pair of mirror image main-line lugs.

8. A base pan as recited in claim 1, further comprising a plurality of square orifices for alignment with a box.

9. A symmetrically formed insulative base pan for a circuit breaker panel board comprising:
a centrally disposed rail extending the length of said pan, said rail having an inverted-T opening throughout the length thereof, said rail including a pair of outer lips extending the length thereof for slidably engaging respective bus bars;
a first pair of channels extending the length of said base pan, each channel being disposed in a parallel relationship on either side of said rail for slidably receiving a pair of main-line lugs;
a pair of outwardly extending double hook formations, each formation being disposed along said base pan parallel to said rail and said channels for mounting a neutral end of a circuit breaker thereupon; and
a second pair of channels extending the length of said base pan, each channel being disposed parallel to said rail and along the outer edge of said base pan for slidably receiving elongated neutral elements thereon.

10. A base pan as set forth in claim 1, including:
a pair of mirror image bus bars slidably engaged in said base pan, each bus bar having a load contact portion extending therefrom in the direction of slidable engagement; and
a pair of mirror image main-line lugs, each of said lugs including means for slidably engaging said pan.

11. A base pan as set forth in claim 11, wherein the pair of mirror image main-line lugs slidably engage the base pan in an engagement format having a threaded passageway in each main-line lug disposed in a direction toward the outside of the base pan, said lugs directly contacting a pair of bus bars.

12. A base pan as set forth in claim 10, wherein the pair of mirror image main-line lugs slidably engage the base pan in an engagement format having a threaded passageway in each main-line lug disposed in a direction toward the inside of the base pan, said engagement format having a main-load circuit breaker mounted directly upon said lugs, and disposed between said lugs and a pair of bus bars.

* * * * *